United States Patent [19]

Friese

[11] 4,290,178

[45] Sep. 22, 1981

[54] ASSEMBLY APPARATUS FOR ELECTRICAL CONNECTORS

[75] Inventor: Egon F. Friese, Tustin, Calif.

[73] Assignee: International Telephone and Telegraph Corporation, New York, N.Y.

[21] Appl. No.: 904,602

[22] Filed: May 10, 1978

[51] Int. Cl.³ .......................... B23P 19/04; B23P 23/04

[52] U.S. Cl. .................................. 29/33 M; 29/38 B; 29/564.6; 29/852; 29/739; 29/759; 227/119; 227/136

[58] Field of Search .................. 29/38 R, 38 B, 564.1, 29/564.6, 566.1, 33 M, 629, 739, 759; 227/95, 110, 116, 119, 136, 139

[56] References Cited

U.S. PATENT DOCUMENTS 3,535,764 10/1970 Hoffman ............................ 227/139
3,588,990 6/1971 Klaus et al. ........................... 29/407
3,608,744 9/1971 Ward et al. ...................... 214/1 DC
3,641,651 2/1972 Rockwell, Jr. et al. .............. 29/701
3,785,035 1/1974 Busler et al. .......................... 29/739
3,797,107 3/1974 Anhalt et al. .......................... 29/625
3,812,581 5/1974 Larson et al. ......................... 29/628
3,837,063 9/1974 Wright ................................. 29/739

*Primary Examiner*—Gil Weidenfeld
*Attorney, Agent, or Firm*—A. Donald Stolzy

[57] ABSTRACT

A machine to assemble electrical contact retention clips in an insulator including an indexing turret having jaws, a jaw operator, a clip carrying strip feed, a clip loading and clip shear-from-strip mechanism, an X-Y table driven by a conventional microcomputer numerical control to position the insulator and a plunger reciprocable through the jaws to insert clips into the insulator holes.

8 Claims, 34 Drawing Figures

STEP 1: INSTALL CLIP IN CAVITY.

STEP 2: INSERT CLIP. THEN HEAT EITHER OR BOTH OF CLIP AND PROBE BEFORE OR AFTER INSERTION.

STEP 3: EMBED BARBS IN DIELECTRIC UNDER HEAT AND PRESSURE

STEP 4: REMOVE PROBE BARBS RETAIN CLIP IN CAVITY.

ASSEMBLY APPARATUS FOR ELECTRICAL CONNECTORS

BACKGROUND OF THE INVENTION

This invention relates to electrical connectors, and more particularly to a machine for automatically assembling electrical contact retention clips in holes in an insulator.

PRIOR ART STATEMENT

This invention was searched. The follc.ving U.S. patents were cited in the search.

| Number | Inventor | Issue Date |
|---|---|---|
| 3,535,764 | Hoffman | Oct. 27, 1970 |
| 3,588,990 | Klaus et al. | June 29, 1971 |
| 3,608,744 | Ward et al. | Sept. 28, 1971 |
| 3,641,651 | Rockwell, Jr. et al. | Feb. 15, 1972 |
| 3,785,035 | Busler et al. | Jan. 15, 1974 |
| 3,797,107 | Anhalt et al. | Mar. 19, 1974 |
| 3,812,581 | Larson et al. | May 28, 1974 |

Ward et al. shows a transfer mechanism including jaws on a rotary member.

Rockwell et al. and Larson et al. show X-Y tables used in operating on printed circuit boards.

Busler et al. in FIGS. 7 and 8, show the insertion of connector clips into a printed circuit board by pins 40.

Hoffman, Klaus et al. and Anhalt et al. show projecting pins.

SUMMARY OF THE INVENTION

According to the present invention, there is provided an automated assembler for inserting an electrical contact retention clip into a hole in an insulator, said assembler comprising: a carrier member; a first pair of jaws movably mounted on said member; a jaw operator actuable to open said first jaws and deactuable to close said first jaws; a reciprocable mechanism actuable to load a clip in between said first jaws when they are open, said first jaws, when closed, forming a cavity to fit snugly around a clip; a plunger slidable in the said cavity of said first jaws; first apparatus for actuating said jaw operator to open said first jaws; second apparatus for actuating said mechanism to load a clip between said first jaws; third apparatus to reciprocate said plunger to eject a clip from the first jaws and insert it into the insulator; fourth apparatus to operate said third apparatus, said second apparatus and said first apparatus in synchronism to cause said first jaws to open before the clip is loaded, to cause said first jaws to close on the clip after the clip has been loaded, and to reciprocate said plunger to eject the clip from the first jaws after the clip has been loaded and the first jaws closed.

BRIEF DESCRIPTION OF THE DRAWINGS

In the accompanying drawings which illustrate exemplary embodiments of the present invention.

DESCRIPTION OF THE PREFERRED EMBODIMENT

Figure 1:
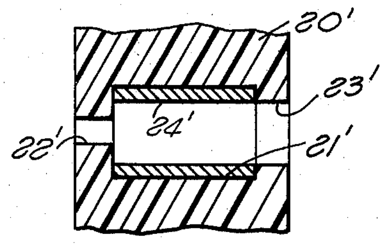
FIG. 1 is a broken away vertical sectional view through an electrical connector assembly which has been partially constructed in accordance with the prior art.
Figure 2:
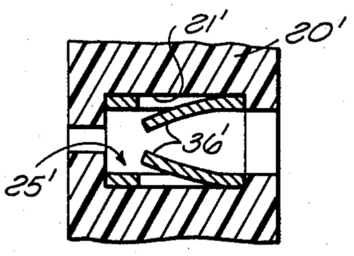
FIG. 2 is a broken away vertical sectional view of a prior art electrical connector assembly.

In FIG. 1, a prior art method of fabricating an electrical connector assembly is shown including an insulator 20' having an internal bore 21', and counter bores 22' and 23'. When insulator 20' is molded, an aluminum sleeve 24' is located on a core pin (not shown), and insulator 20' is molded around sleeve 24'. When insulator 20' has been molded around sleeve 24' as shown in FIG. 1, sleeve 24' is removed from bore 21' by etching with an acid. A contact retention clip 25' shown in FIG. 2 is then placed in bore 21'. Clip 25' may be similar to or identical to one of the clips disclosed in U.S. Pat. No. 3,158,424 issued Nov. 24, 1964. Clip 25' releasably retains an electrical connector contact, not shown.

The prior art method of making the electrical connector assembly shown in FIG. 2 is expensive because it is expensive to etch sleeve 24' in FIG. 1, and it is expensive to insert clip 25' in bore 21' shown in FIG. 2.

Figure 3:
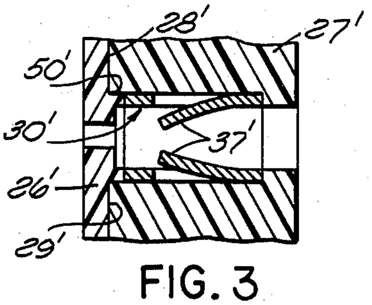
FIG. 3 PRIOR ART
FIG. 3 is a broken away vertical sectional view of another prior art electrical connector assembly.

Another prior art electrical connector assembly is shown in FIG. 3 including two insulators 26' and 27' which may be cemented together along lines 28' and 29'. A clip is provided at 30' which, if desired, may be identical to clip 25'. Insulators 26' and 27' are molded, assembled to clip 30', and cemented together. The electrical connector assembly of the prior art shown in FIG. 3 is expensive to make because it requires two parts, a connecting operation, and thin barriers 50' to avoid voltage breakdown.

The contact retention assembly disclosed in U.S. Pat. No. 3,494,998 issued Feb. 10, 1970, has a construction similar to that illustrated in FIG. 2. However, it has the disadvantage that the rear of the insulator is often uneven so that the pushout forces for the clips are not uniform.

Figure 4:
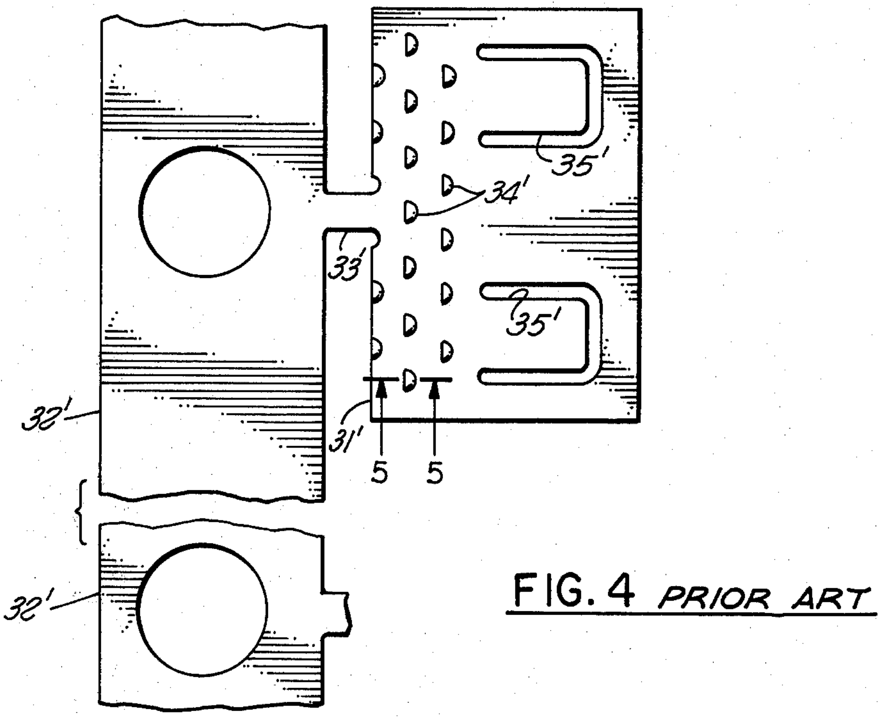
FIG. 4 PRIOR ART
FIG. 4 is a top plan view of a formed blank from which a prior art contact retaining clip is fabricated.
Figure 5:
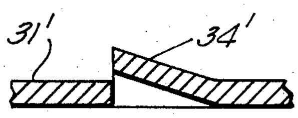
FIG. 5 PRIOR ART
FIG. 5 is a vertical sectional view through a portion of the blank shown in FIG. 4, taken along line 5—5 therein.

In accordance with the present invention, a conventional blank 31' of resilient sheet metal shown in FIG. 4 may be continually made on a strip 32' and may be connected thereto by means illustrated at 33'. The blank is substantially flat except for barbs 34' shown in FIGS. 4 and 5. The barbs are stamped out of the material of the blank 31' thus leaving small apertures in the blanks, as seen in FIG. 5. The blank embodies leaf spring tines 35' similar to or identical to tines 36' and 37' shown in FIGS. 2 and 3, respectively. The blank 31' is partially formed into a contact retention clip as illustrated at 38' in FIG. 6 having a generally cylindrical configuration.

A one-piece molded insulator body 12" formed of thermally deformable material is employed for mounting clip 38' or a clip 10" similar to or identical to clip 38' as shown in FIGS. 8, 9, 10, and 11 which are shown inverted.

After a clip is loaded into an insulator in accordance with the present invention, it may be heat staked as described herein and as described in copending application Ser. No. 788,315 filed Apr. 18, 1977, by G. J. Selvin et al. for ELECTRICAL CONNECTOR ASSEMBLY AND METHOD OF MAKING THE SAME assigned to the assignee of the instant application.

Figure 8:
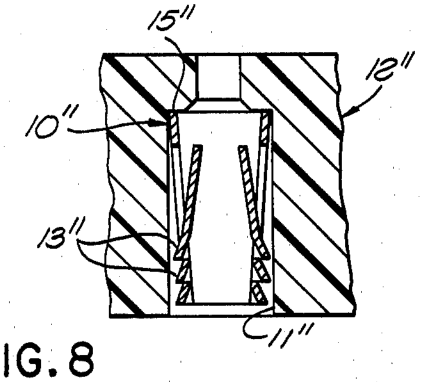
FIGS. 8, 9, 10, and 11 are broken away vertical sectional views of an insulator and a clip similar to that shown in FIG. 6 illustrating prior art steps which may be performed subsequent to or including those of the present invention to lodge the clip in a fixed position in a bore in the insulator.
Figure 9:
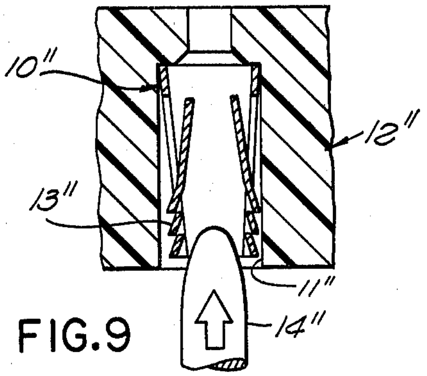
Figure 10:
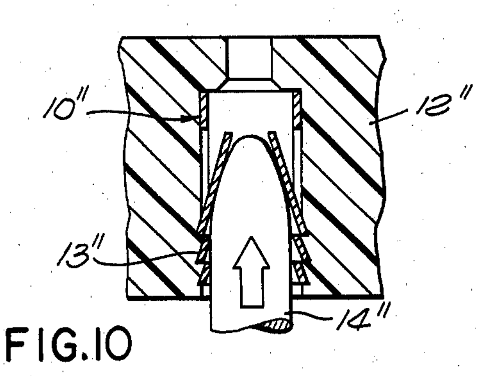
Figure 11:
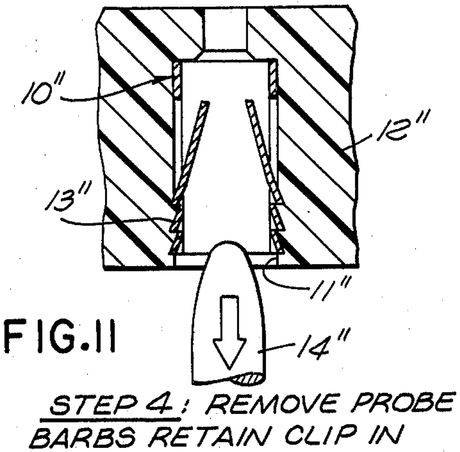

In general, the clip 10" is inserted into a cylindrical bore 11" in insulator body 12". Preferably, the forward end of the clip 10" abuts a shoulder 15" in the bore 11", as seen in FIG. 8. The clip 10" may have a loose sliding fit in the bore or may frictionally engage the wall of the bore when first inserted therein. The insulator material of body 12" surrounding the bore is heated to a sufficient temperature to cause it to soften and flow under pressure. The clip is caused to expand in the bore so that barbs 13" thereon will become embedded in the softened insulator material as seen in FIG. 11. The softened material totally surrounds the barbs to prevent the possibility of Corona discharge degradation between adjacent clips in the insulator body. When the clip is expanded in the bore, some of the softened insulator material will flow into the small apertures in the clip formed by the stamped out barbs. This will enhance retention of the clip in bore 11" and will prevent moisture from the external environment from leaking through the apertures behind the clip wall. Thus, after loading in accordance with the present invention, by the above-described heat staking operation, the clip is seized by the insulator material to hold the clip firmly against axial movement in bore 11". The insulator material surrounding the bore may be heated by directly heating the entire insulator (as in an oven) or by heating the clip, in which case the insulator material is heated by conduction. The clip 10" and/or body 12" may be heated before insertion of the clip into bore 11" or by induction heating of the clip after insertion, for example.

Preferably, the diameter of the clip in its relaxed or unstressed condition is greater than the diameter of the bore 11" in body 12". In this case, the clip may be stressed into a symmetrical right cylinder to reduce its cross-section in order to insert it into the bore by means to be described. In such a case it may possess relatively high hoop stress when inserted into the bore. If the clip is inserted into the bore warm or hot, or if the insulator is heated to a softened state, the clip will expand to the position shown in FIG. 11 without further operations due to its inherent resiliency.

After the clip is initially inserted into the bore, it simply frictionally engages the wall of the bore. A cylindrical probe 14" is then pushed into the clip. The probe has a diameter larger than the inside diameter of clip 10" when the clip is initially inserted into bore 11". Preferably, the diameter of probe 14" is equal to the diameter of bore 11" less two times the thickness of the wall of the clip (excluding the barbs 13"). The end of the probe is tapered to facilitate its insertion into the clip. Also, preferably probe 14" is heated so that when it is pushed into the clip, heat from the probe will transfer through the clip by conduction to the insulator causing the same to soften. Simultaneously with the probe heating the insulator, the clip is expanded by the probe causing the barbs 13" in the clip to embed into the softened insulator material surrounding bore 11". As stated previously, some insulator material will also be forced into the apertures in clip 10" resulting from the stamped out barbs 13". The probe is then removed from bore 11" and the softened insulation material cools and hardens to seize about the barbs and fixedly retain the clip within the bore.

All of the foregoing is made possible by the machine of the present invention illustrated in FIGS. 12 to 34, inclusive.

THE PRESENT INVENTION

Figure 12:
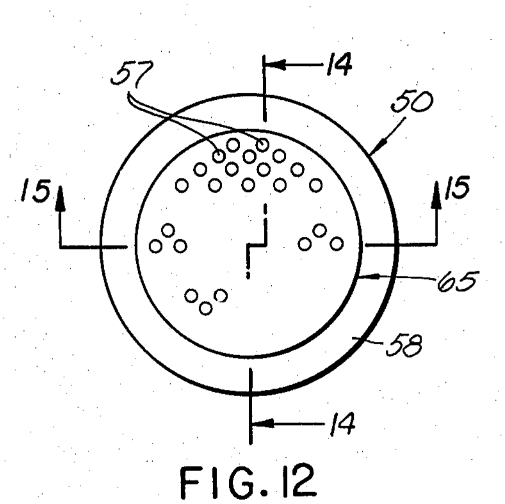
FIG. 12 is a top plan view of an insulator constructed in accordance with the present invention.
Figure 13:
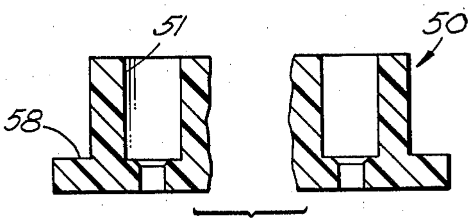
FIG. 13 is a broken vertical sectional view of the insulator shown in FIG. 12.
Figure 14:
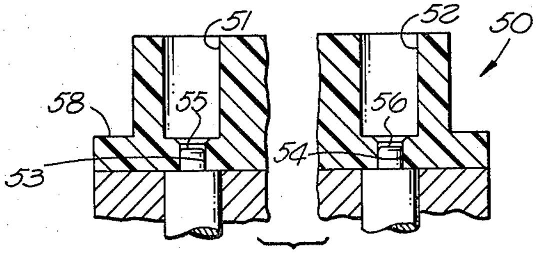
FIG. 14 is a vertical sectional view of the insulator taken on the line 14—14 shown in FIG. 12.

In FIG. 12, an insulator 50 is provided which may be of the type employed with the present invention. Insulator 50 is different from conventional insulators in that two particularly located bores 51 and 52 are provided therein as shown in FIG. 14 having counterbores 53 and 54, respectively, into which respective pins 55 and 56 are located. Pins 55 and 56 locate insulator 50 relative to a horizontal plane so that clips may be inserted in all the other bores 57 therein shown in FIG. 12, as well as in bores 51 and 52. Pins 55 and 56 are again shown in FIG. 32.

Figure 32:
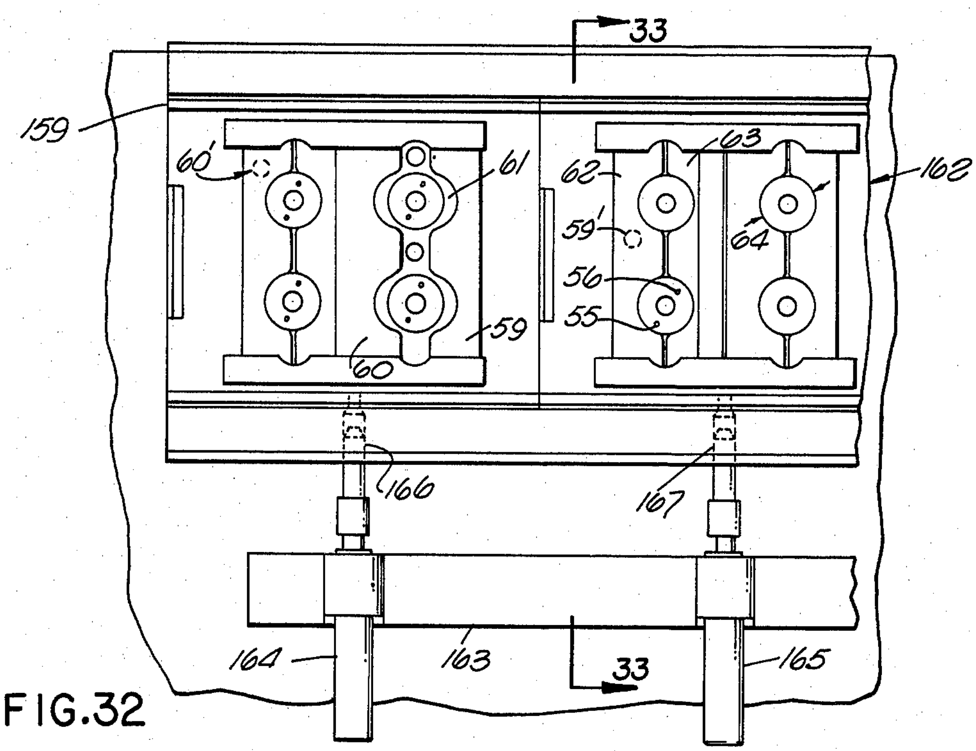
FIG. 32 is a top plan view of an insulator carrier.

Insulator 50 also is held by a flange 58 below sliding plates 59 and 60 which are shown in the open position in FIG. 32. Plates 59 and 60 snap together in that they are provided with concave recesses on the bottom which slide over spring biased detents fixed to plate 61. A plurality of such detents and recesses may be provided at appropriate locations, only two of which are shown at 59' and 60'. Plates 62 and 63 are identical to plates 59 and 60, but are shown in the closed position. For clarity, no insulator 50 is shown in FIG. 32. FIG. 32 is a top plan view of an arrangement which lies below that portion of the apparatus which inserts a clip into the bores of insulator 50. Diameter 64 shown in FIG. 32 may be slightly larger than the diameter of that portion of insulator 50 indicated at 65 in FIG. 12.

Figure 15:
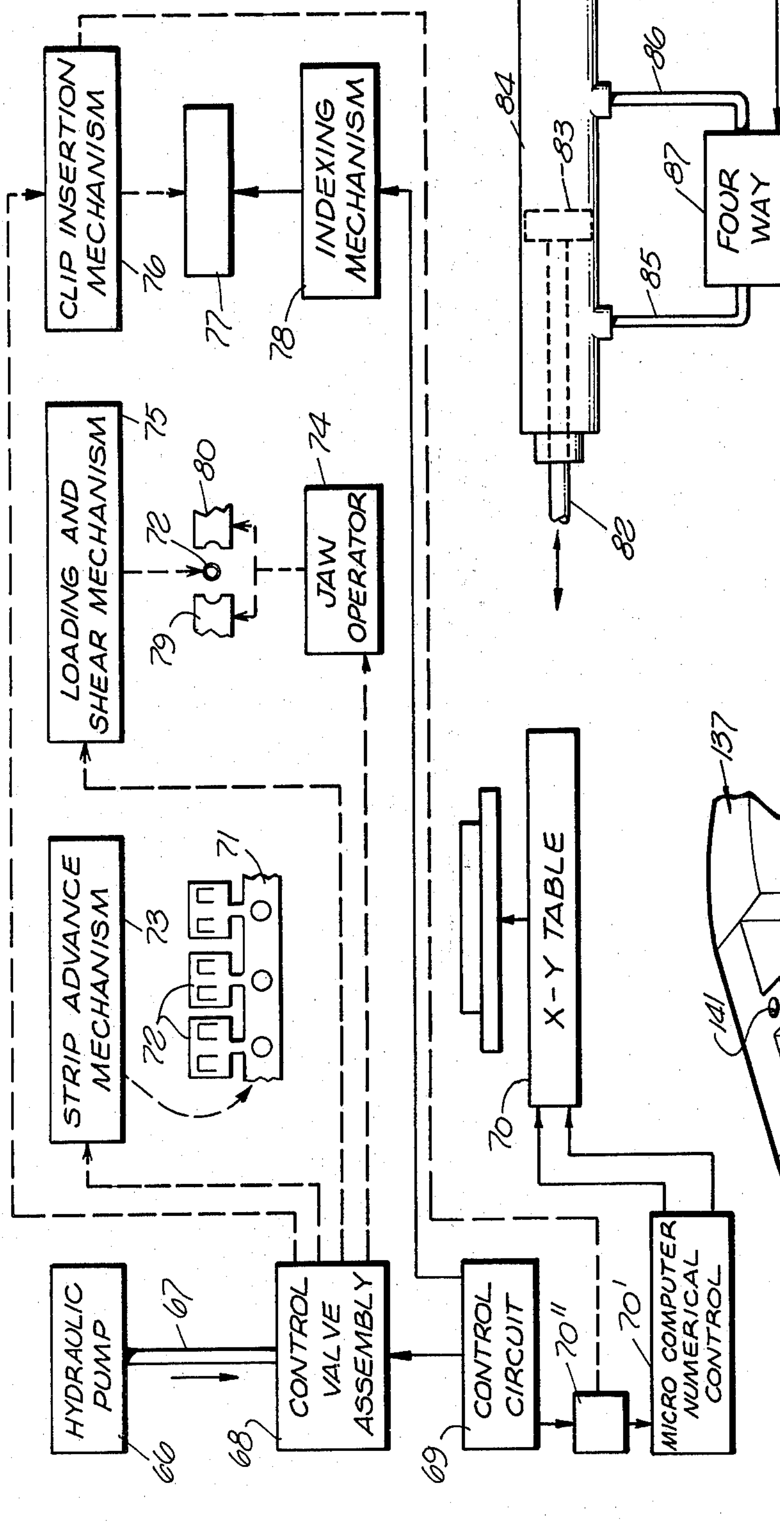
FIG. 15 is a block diagram of the machine of the present invention.

A block diagram of the machine of the present invention is shown in FIG. 15 including pump 66 having a connection 67 to a control valve assembly 68. A control circuit 69 is connected to an indexing mechanism 78 and control valve assembly 68. Circuit 69 is also connected through a limit switch 70'' operated by a clip insertion mechanism 76 to a conventional microcomputer numerical control 70' which operates a conventional X-Y table 70. Switch 70'' insures that the insertion step has ended. Similarly a safety switch 70''' in FIG. 17 can be employed to enable a stepper motor 103. Switches 70''' and 70'' may be operated simultaneously by mechanism 76.

Figure 6:
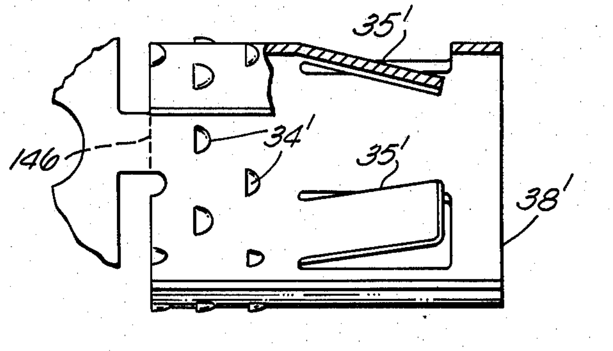
FIG.6 PRIOR ART
FIG. 6 is a broken away view, partly in section, of a clip formed from the blank shown in FIG. 4.
Figure 7:
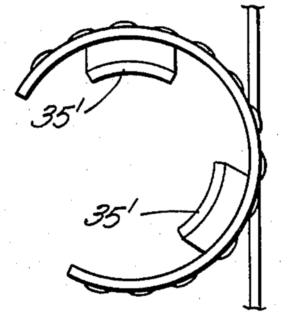
FIG.7 PRIOR ART
FIG. 7 is a right end elevational view of a contact retaining clip illustrated in FIG. 6.

In FIG. 15 a strip 71 of partly formed clips 72 as in FIGS. 6 and 7 is advanced by a mechanism 73 operated by assembly 68. Assembly 68 likewise controls a jaw operator 74, loading and shear mechanism 75, and clip insertion mechanism 76.

Indexing of a turret 77 is performed by a mechanism 78 also connected from control circuit 69.

As will be explained, turret 77 controls four pairs of jaws similar to jaws 79 and 80 (FIG. 24), the angle between each two adjacent pairs being 90 mechanical degrees.

OPERATION

In operation, the strip advance mechanism 73 and the indexing mechanism 78 may be operated simultaneously, if desired, by control circuit 69 directly (indexing mechanism 78) and through control valve assembly 68 (to strip advance mechanism 73). Indexing mechanism 78 is entirely conventional and rotates turret 77 90 degrees each time a clip is loaded between jaws 79 and 80.

Next in order, assembly 68 opens jaws 79 and 80 by actuation of jaw operator 44. While jaws 79 and 80 are open, assembly 68, each time controlled by circuit 69, operates loading and shear mechanism 75, which places a clip 72 in between jaws 79, 80 and shears the clip from the strip 71. Assembly 68 then withdraws the insertion structure by operating mechanism 75, and jaw operator 74 is operated by assembly 68 to close jaws 79 and 80.

At successive time intervals, one clip 72 is seized after being loaded and while another is inserted. The jaws on top of the turret 77 are normally open when clip insertion mechanism 76 is operated to insert a clip into insulator 50, but the jaws 180 degrees opposite the upper jaws remain closed. An ejection pin 81 shown in FIGS. 18, 30 and 31 inserts a clip located in the lower jaws into insulator 50. This pin is operated by clip insertion mechanism 76, preferably at the same time that loading and shear mechanism 75 loads and shears a clip in between jaws 79 and 80. See mechanism 76 in FIG. 29.

In FIG. 15, as stated previously, indexing mechanism 78 may be entirely conventional. The same is true of pump 66 and control valve assembly 68. The same is also true of X-Y table 70. As is well known, the X-Y table can cycle and hold, in succession, the insulators 50 located as shown in FIG. 32 and move the same in a cyclic manner so that clips may be inserted into each of the bores 51, 52 and 57 shown in FIGS. 12 and 14.

Figure 16:
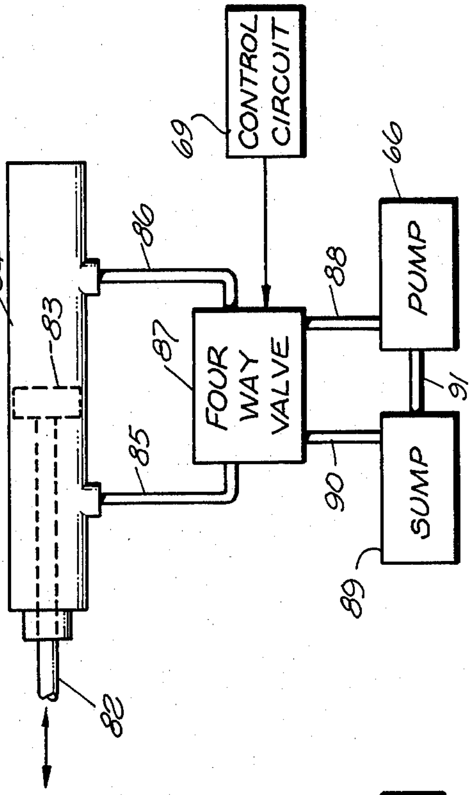
FIG. 16 is a diagrammatic view of a machine actuator constructed in accordance with the present invention.
Figure 24:
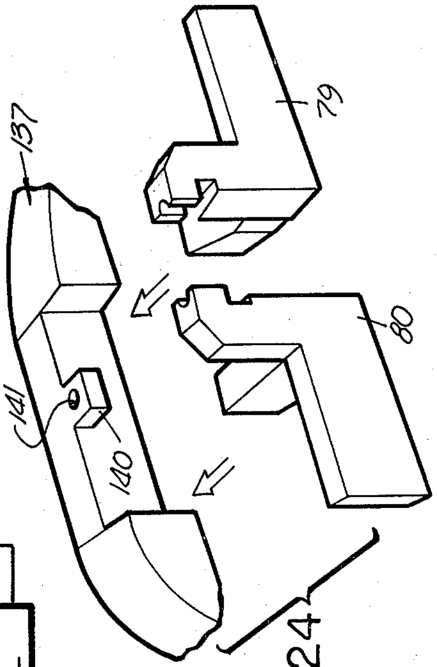
FIG. 24 is an exploded perspective view of the jaws and a portion of the turret.

Assembly 68 may include a plurality of arrangements substantially identical to that shown in FIG. 16, if desired. In FIG. 16, mechanical movement is produced by a piston rod 82 where a piston 83 is located in the cylinder 84 having connections 85 and 86 from a four-way valve 87. Valve 87 then has connections from pump 66 via a conduit 88 and to a sump 89 via a conduit 90, sump 89 being connected to pump 66 via a conduit 91. As indicated in FIG. 15, control circuit 69 controls valve 87, valve 87 being a solenoid valve.

Figure 17:
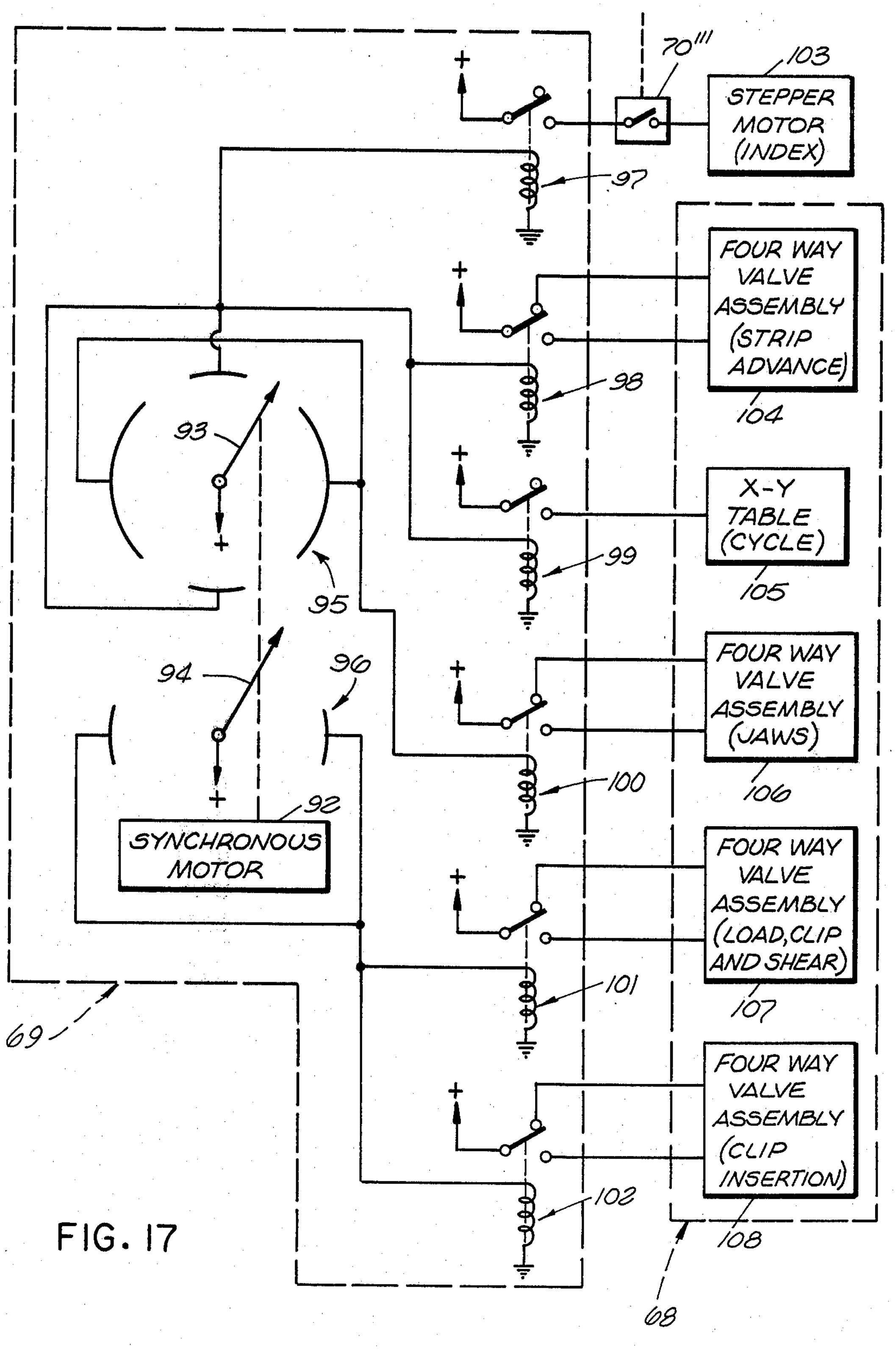
FIG. 17 is a schematic diagram of a control valve assembly and a control circuit shown in FIG. 15.

As shown in FIG. 17, a synchronous motor 92 acts as a sequencing device by rotating wipers 93 and 94 of multiple contact switches 95 and 96, respectively. Switches 95 and 96 have contacts arranged to keep certain of the valves in assembly 68 actuated longer than others of the valves.

Switches 95 and 96 operate turret 77 through indexing mechanism 78, for example, 180 degrees for each complete revolution of the wipers 93 and 94.

Control circuit 69 is indicated by a dotted box in FIG. 17 and is provided with relays 97, 98, 99, 100, 101 and 102 which are connected to stepper motor 103, a strip advance valve 104, X-Y table 105, valve 106, loading valve 107 and insertion valve 108, respectively. The valves 104, 106, 107, 108 and X-Y table 105 are located in assembly 68.

Figure 18:
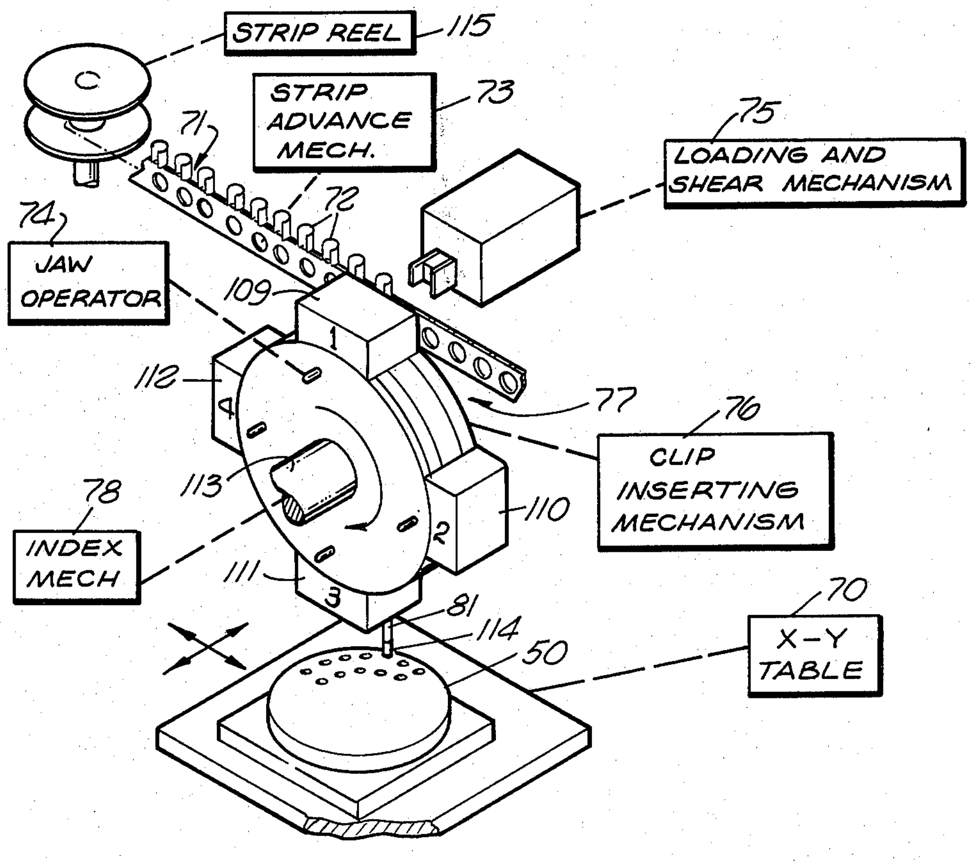
FIG. 18 is a partially perspective view of the machine of the present invention.

In FIG. 18, turret 77 is shown with jaw stations 109, 110, 111 and 112. Indexing mechanism 78 operates on a shaft 113. A clip about to be inserted in a bore in insulator 50 is illustrated at 114. The clip-carrying strip 71 feeds off of a reel 115.

Figure 19:
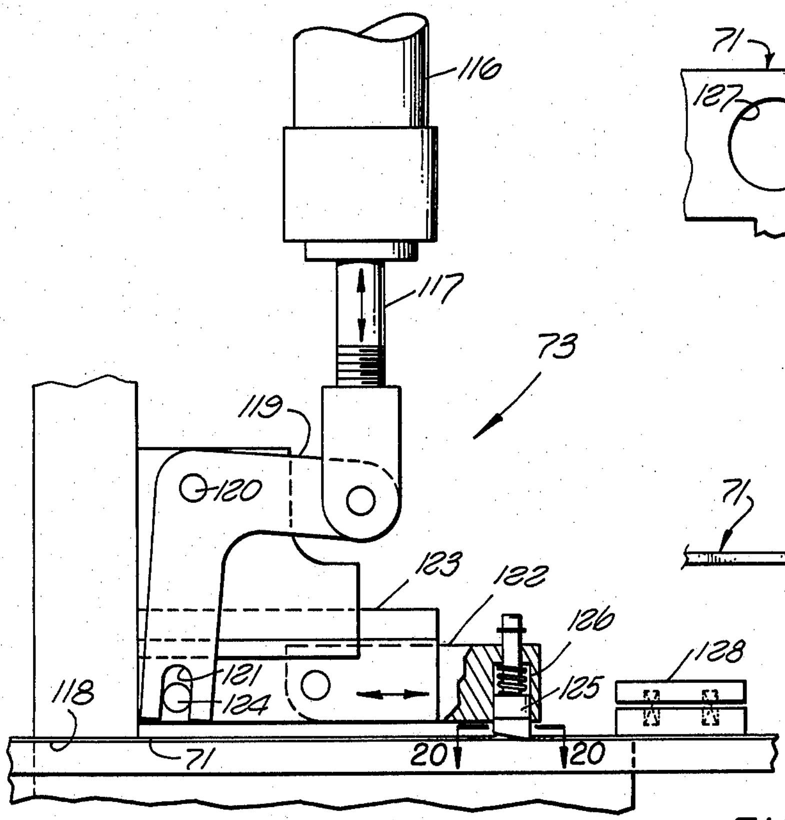
FIG. 19 is a top plan view of a clip strip feed or strip advance mechanism shown in FIG. 15.
Figure 20:
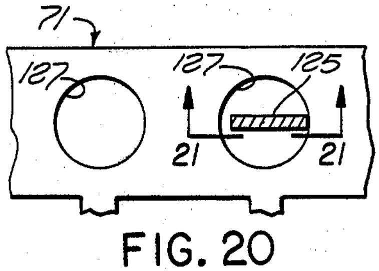
FIG. 20 is a vertical sectional view of the mechanism taken on the line 20—20 shown in FIG. 19.

A cylinder 116 in the assembly 68 has an output shaft or piston rod 117 which is connected, as shown, to the strip advance mechanism 73 in FIG. 19. If shown, the clips could be seen on strip 71 in groove 118. However, the clips have been omitted in FIG. 19 for clarity.

Reciprocation of shaft 117 causes rotation back and forth of a lever 119 about the axis of a pin 120. Lever 119 has a slot 121 which reciprocates a member 122. Member 122 is guided on base 123 so that it does not rotate. A pin 124 is slidable in slot 121. Pin 124 is fixed relative to member 122.

Figure 21:
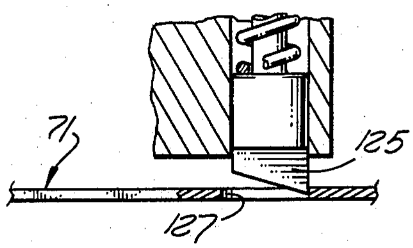
FIG. 21 is a horizontal sectional view of the mechanism taken on the line 21—21 shown in FIG. 20.

Member 122 carries a detent 125 which is biased by a spring 126 against strip 71. Although not shown, the lower end of detent 125 normally bears against strip 71 or lies below the upper surface thereof in a hole 127 as shown in FIG. 21. Detent 125, when member 122 is moved to the left, frictionally engages strip 71 to the next hole 127 to the rear, or to the left, as viewed in FIG. 19. Movement of strip 71 to the left as viewed in FIG. 19 is prevented by a block 128 spring biased against strip 71.

From the foregoing, it will be appreciated that strip advance mechanism 73 shown in FIG. 19 operates, more or less, as a linear ratchet.

Figure 22:
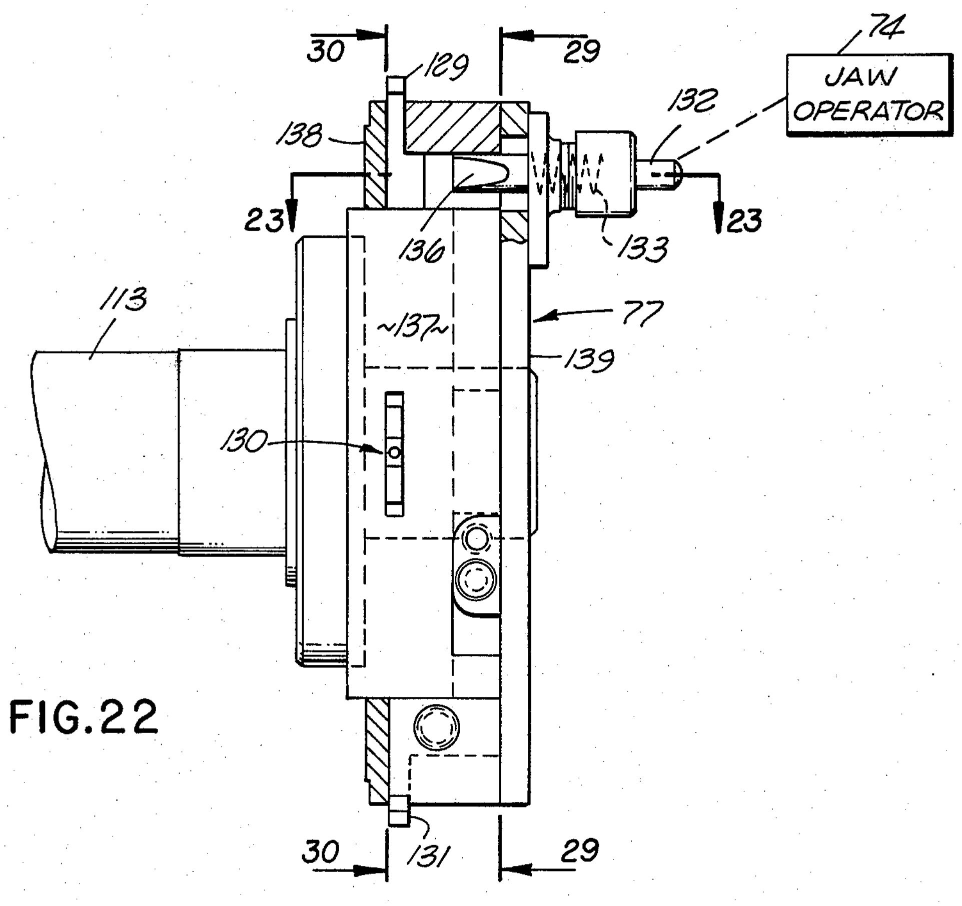
FIG. 22 is a vertical elevational view of a rotary member or turret of the machine of the present invention.

Turret 77 is shown in FIG. 22 with shaft 113. Turret 77 has jaws 129, 130 and 131. The fourth set of jaws cannot be seen but are directly opposite jaws 130. Jaws 130 never carry a clip. Loading it takes place at the location of jaws 129. Insertion of a clip into insulator 50 takes place at jaws 131.

Jaw operator 74 opens the jaws that happen to be located at the position of jaws 129. This function is performed by pressing a pin 132 to the left, as viewed in FIG. 22. Pin 132 is biased by a spring 133 to the right, as viewed in FIG. 22. Pins identical to pin 132 are provided for each of the four pairs of jaws.

Figure 23:
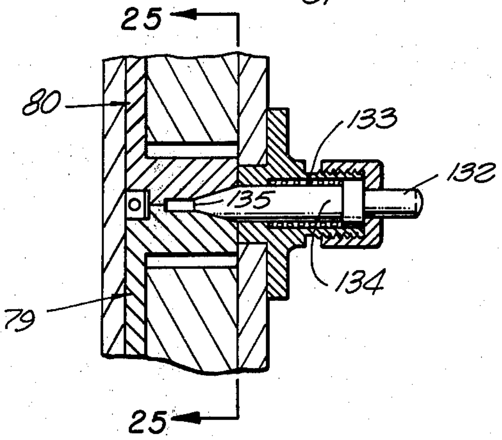
FIG. 23 is a horizontal sectional view of a pair of clip retaining jaws and a portion of a jaw operator taken on the line 23—23 shown in FIG. 22.

Pin 132 is again shown in FIG. 23. Pin 132 is fixed to a shaft 134 that terminates at 135 but has an elliptical taper 136 (see FIG. 22).

Figure 31:
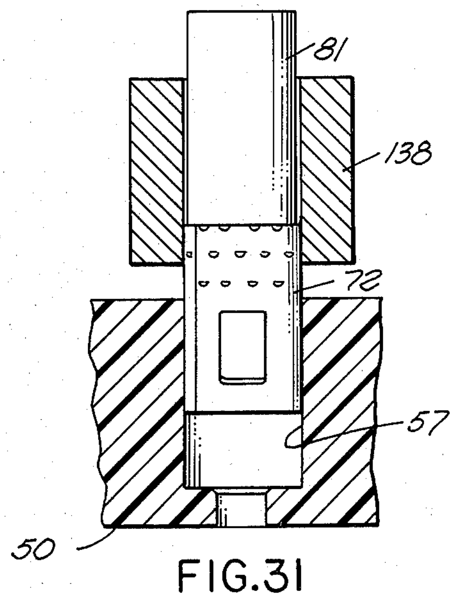
FIG. 31 is a vertical sectional view illustrating how the machine of the present invention inserts a clip into an insulator.
Figure 30:
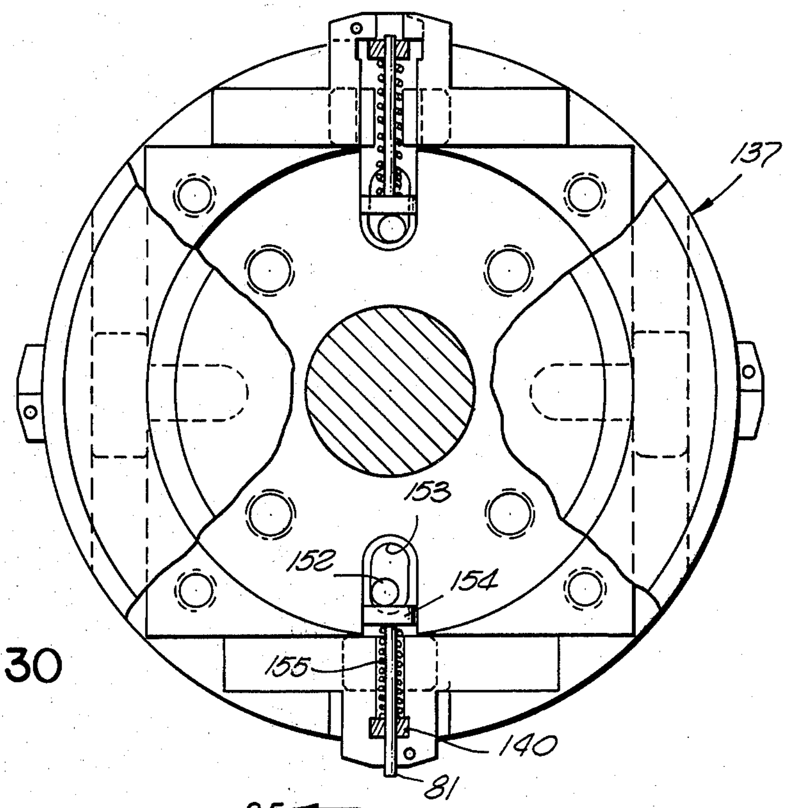
FIG. 30 is the other side elevational view of the turret central portion.

As seen in FIG. 22, turret 77 has a central portion 137 sandwiched between a pair of plates 138 and 139. Central portion 137 has a projection 140 (FIG. 24) which fits in between jaws 79 and 80. Projection 140 has a hole 141 therethrough which guides ejection pin 81 (FIGS. 18, 30 and 31.) See also FIG. 24.

Figure 25:
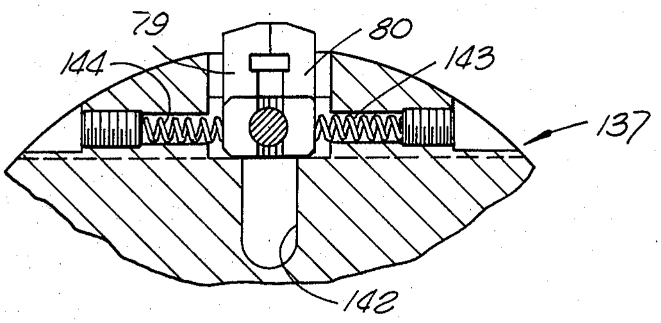
FIG. 25 is a vertical sectional view of the jaws taken on the line 25—25 shown in FIG. 23.

As shown in FIG. 25, portion 137 of turret 77 has a slot 142 through which a Pitman connection operates ejection pin 81, to be described. Springs are provided at 143 and 144 to bias jaws 79 and 80 together.

Figure 26:
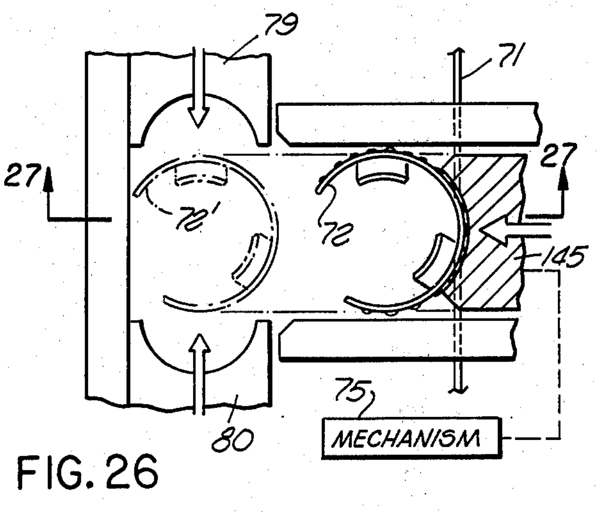
FIG. 26 is a top plan view of open jaws and a reciprocable loading projection forming a portion of a loading and shear mechanism shown in FIG. 15.
Figure 27:
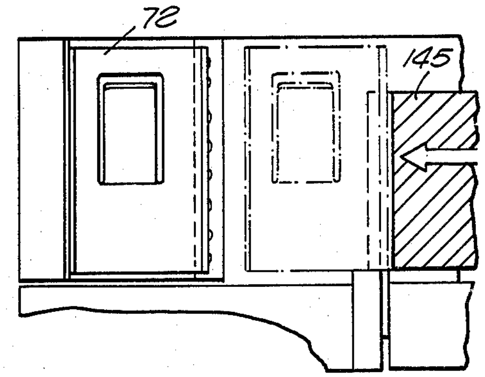
FIG. 27 is a vertical sectional view taken on the line 27—27 shown in FIG. 26.
Figure 28:
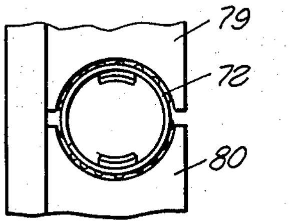
FIG. 28 is a view similar to that of FIG. 26 with the jaws closed.
Figure 29:
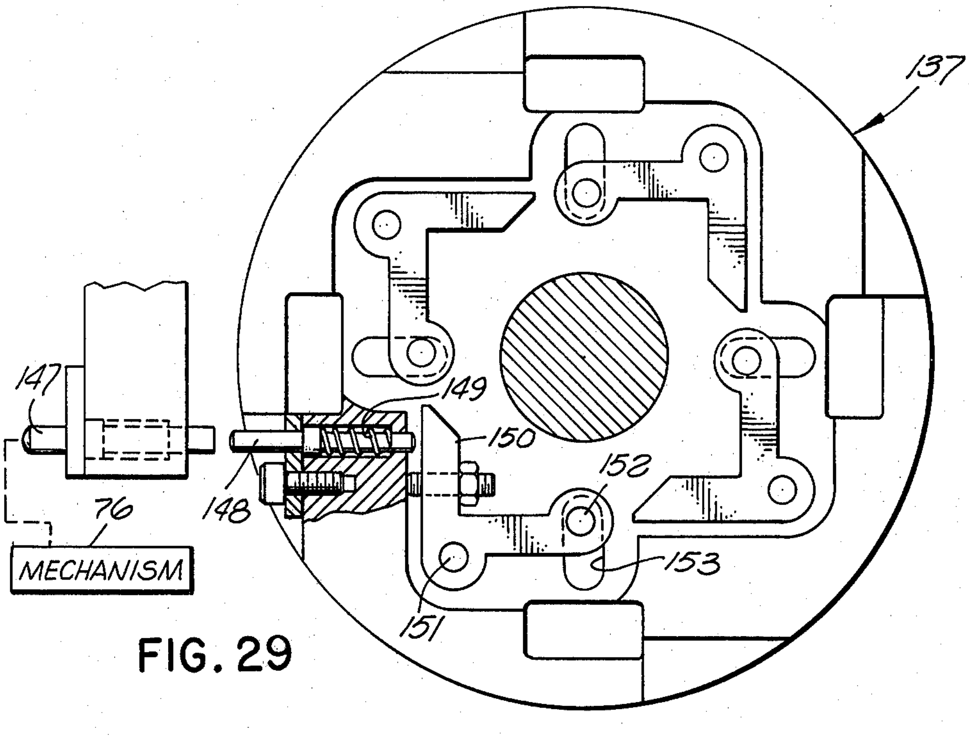
FIG. 29 is a side elevational view of a central portion of the turret shown in FIG. 22.

In FIG. 26, a shaft 145 presses clip 72 to the dotted line position 72′ in between jaws 79 and 80, and at the same time, shears clip 72 from strip 71 at edge 146 (FIG. 6). Shaft 145 is then withdrawn and the clip 72 is left in the position shown in FIG. 27. Jaws 79 and 80 are then closed and clip 72 appears as shown in FIG. 28. Portion 137 of turret 77 is again shown in FIG. 29. A pin 147 is operated by clip insertion mechanism 76 to depress a pin 148 biased by a spring 149 that rotates a lever 150 about a pin 151. Such structures are provided for each of the said four pairs of jaws, except for pin 147 and mechanism 76. When pin 148 is depressed or moved to the right, as shown in FIG. 29, a dowel pin 152 fixed to lever 150 projects through a slot 153 in turret portion 137 and depresses a head 154 of ejection pin 81 shown in FIG. 30.

Projection 140 is fixed to turret portion 137, as stated previously. A spring 155 is provided to bias head 154 of ejection pin 81 against dowel 152. Clip 72 shown in FIG. 31 then is inserted into a bore 57 of insulator 50.

Figure 33:
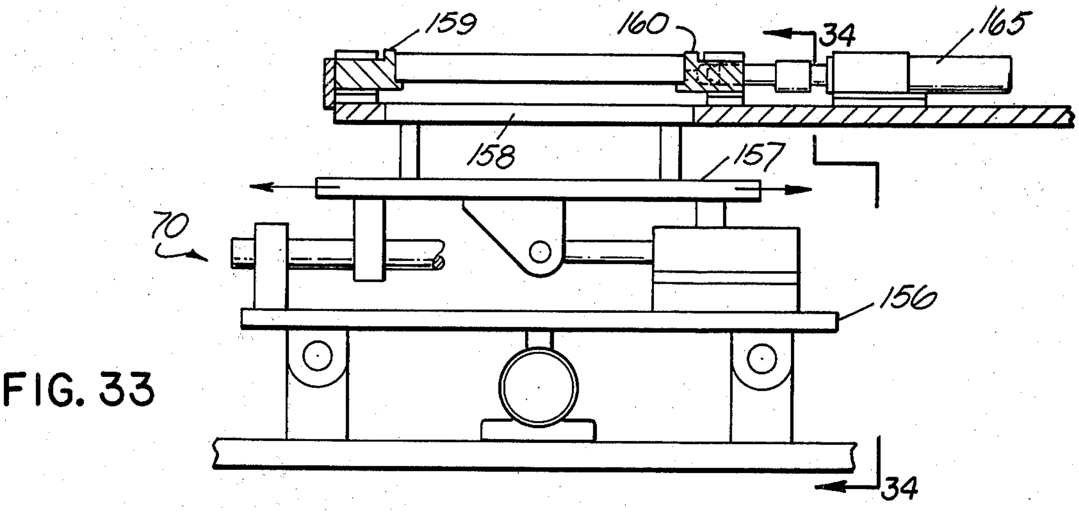
FIG. 33 is a vertical sectional view of the insulator carrier taken on the line 33—33 shown in FIG. 32.
Figure 34:
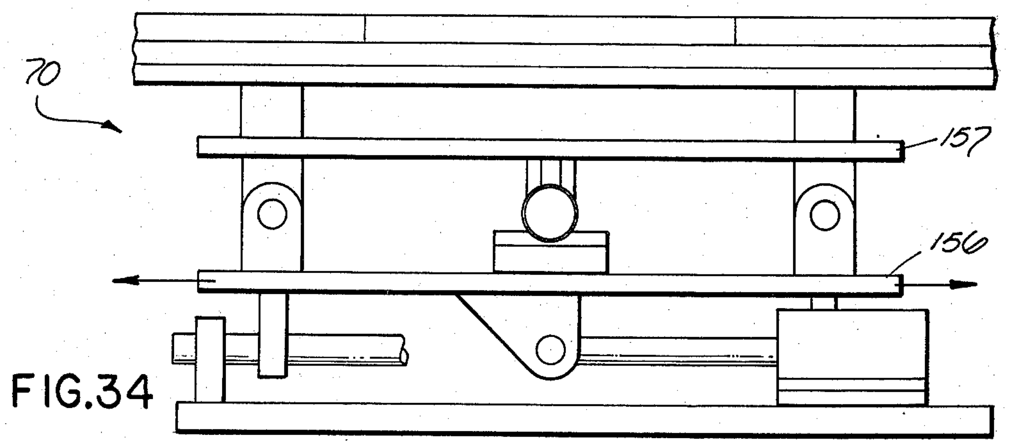
FIG. 34 is another vertical sectional view of the insulator carrier taken on the line 34—34 shown in FIG. 33.

As shown in FIG. 33, an X-table 156 is shown mounted below a Y-table 157. A plate 158 is fixed to Y-table 157. Plate 158 carries guides 159 and 160 for sleds 161 and 162 shown in FIG. 32. A plate 163 in FIG. 32 supports solenoids 164 and 165 which project shot pins 166 and 167, respectively, through holes in guide 160, and recesses in sleds 161 and 162. Sleds 161 and 162 are slidable in guides 159 and 160. Shot pins 166 and 167 are then operated by solenoids 164 and 165 to locate sleds 161 and 162 in proper positions for inserting clips into insulators mounted in slides 161 and 162.

In FIG. 15, as stated previously, pump 66, assembly 68, X-Y table 70 and indexing mechanism 78 may be entirely conventional by themselves. At least the component parts of assembly 68 are conventional, if not the combination of all the parts illustrated in FIG. 16 for each function performed by mechanisms 73, 75, 76 and jaw operator 74.

Although, in FIG. 16, piston 83 inside cylinder 84 is not spring biased, as shown, it may be spring biased and other devices may be employed to reciprocate piston rod 82 or the like.

Although one sequence of operation has been described, others are possible. The invention is therefore not limited to the precise sequence disclosed herein.

The word "actuable" or "operable" or the like, for use herein and in the claims, is hereby defined to include "deactuable" or the like. Similarly, the word "deactuable" or the like, for use herein and in the claims, is hereby defined to include either "actuable" or "operable" or the like.

What is claimed is:

1. An automated assembler for inserting an electrical contact retention clip into a hole in an insulator, said assembler comprising: a carrier member; a first pair of jaws movably mounted on said member; a jaw operator mounted and actuable to open said first jaws and deactuable to close said first jaws; a reciprocable mechanism actuable to load a clip in between said first jaws when they are open, said first jaws, when closed, forming a cavity to fit snugly around a clip; a plunger slidable in the said cavity of said first jaws; first means for actuating said jaw operator to open said first jaws; second means for actuating said mechanism to load a clip between said first jaws; third means to reciprocate said plunger to eject a clip from the first jaws and insert it into the insulator; fourth means to operate said third means, said second means and said first means in synchronism to cause said first jaws to open before the clip is loaded, to cause said first jaws to close on the clip after the clip has been loaded, and to reciprocate said plunger to eject the clip from the first jaws after the clip has been loaded and the first jaws closed.

2. The invention as defined in claim 1, wherein fifth means are provided which are operable by said fourth means to advance a strip having clips attached therealong so that each clip is positioned for loading in a step-by-step manner prior to actuation of said second means to load a clip.

3. The invention as defined in claim 2, wherein said carrier member is mounted to rotate about a horizontal axis, said carrier member having at least a second pair of jaws 180 mechanical degrees away from said first pair and actuable in the same way but at different times, sixth means to index by rotating said carrier member in one direction to predetermined first and second positions to position said first and second pairs of jaws alternately at the top and bottom of their rotary travel, said second means and said third means both being operated by said fourth means on respective pairs of jaws in their top and bottom locations, respectively, while said carrier member is stationary in each of said first and second predetermined positions so that one clip is loaded about the time that another is inserted, said sixth means being operated synchronously with said first means, said second means and said third means by said fourth means.

4. The invention as defined in claim 3, wherein an X-Y table is provided that is actuable by said fourth means in synchronism with said sixth means to hold an insulator.

5. The invention as defined in claim 2, wherein said carrier member is mounted to rotate about a horizontal axis, said carrier member having at least a second pair of jaws 180 mechanical degrees away from said first pair and actuable in the same way but at different times, sixth means to index by rotating said carrier member in one direction to predetermined first and second positions to position said first and second pairs of jaws alternately at the top and bottom of their rotary travel, said second means and said third means both being operated by said fourth means on respective pairs of jaws in their top and bottom locations, respectively, while said carrier member is stationary in each of said first and second predetermined positions so that one clip is loaded about the time that another is inserted, said sixth means being operated synchronously with said first means, said second means and said third means by said fourth means.

6. The invention as defined in claim 5, wherein an X-Y table is provided that is actuable by said fourth means in synchronism with said sixth means to hold an insulator.

7. The invention as defined in claim 1, wherein said carrier member is mounted to rotate about a horizontal axis, said carrier member having at least a second pair of jaws 180 mechanical degrees away from said first pair and actuable in the same way but at different times, fifth means to index by rotating said carrier member in one direction to predetermined first and second positions to position said first and second pairs of jaws alternately at the top and bottom of their rotary travel, said second means and said third means both being operated by said fourth means on respective pairs of jaws in their top and bottom locations, respectively, while said carrier member is stationary in each of said first and second predetermined positions so that one clip is loaded about the time that another is inserted, said fifth means being operated synchronously with said first means, said second means and said third means by said fourth means.

8. The invention as defined in claim 7, wherein an X-Y table is provided that is actuable by said fourth means in synchronism with said fifth means to hold an insulator.

* * * * *